US009990174B2

(12) United States Patent
Stuckman et al.

(10) Patent No.: US 9,990,174 B2
(45) Date of Patent: *Jun. 5, 2018

(54) SYSTEM AND METHOD FOR CREATING AND NAVIGATING A LINEAR HYPERMEDIA RESOURCE PROGRAM

(71) Applicant: Hypermedia Navigation LLC, Dallas, TX (US)

(72) Inventors: Bruce Edward Stuckman, Austin, TX (US); Barry James Sullivan, Long Grove, IL (US); Wayne Robert Heinmiller, Elgin, IL (US); Richard Omanson, Naperville, IL (US); Jordan Howard Light, Northbrook, IL (US); Robert Wesley Bossemeyer, Jr., St. Charles, IL (US); James Richard Morse, Plainfield, IL (US); Kent E. Genin, Chicago, IL (US)

(73) Assignee: Hypermedia Navigation LLC, Dallas, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/832,482

(22) Filed: Dec. 5, 2017

(65) Prior Publication Data
US 2018/0095717 A1    Apr. 5, 2018

Related U.S. Application Data

(63) Continuation of application No. 15/681,714, filed on Aug. 21, 2017, now Pat. No. 9,864,575, which is a
(Continued)

(51) Int. Cl.
G06F 15/16    (2006.01)
G06F 3/16    (2006.01)
(Continued)

(52) U.S. Cl.
CPC ............ *G06F 3/165* (2013.01); *G06F 3/0482* (2013.01); *G06F 3/04817* (2013.01);
(Continued)

(58) Field of Classification Search
CPC . G06F 17/30; G06F 17/3074; G06F 17/30873
(Continued)

(56) References Cited

U.S. PATENT DOCUMENTS 5,303,367 A    4/1994 Leenstra, Sr. et al.
5,408,655 A    4/1995 Oren et al.
(Continued)

FOREIGN PATENT DOCUMENTS

CA    2208874 C    5/2001
WO    9849634 A1    11/1998

OTHER PUBLICATIONS

Yahoo Holdings, Inc.'s Invalidity Contentions, Dated Nov. 6, 2017, Pursuant to Local Patent Local Rule 3-3; Nov. 6, 2017; 1465 pages.
(Continued)

*Primary Examiner* — Bharat N Barot
(74) *Attorney, Agent, or Firm* — Garlick & Markison; Bruce E. Stuckman

(57) ABSTRACT

A method and system for creating and navigating linear hypermedia resource programs are disclosed. The system includes a distributed hypermedia resource network having a plurality of hypermedia resources residing on one or more remote information nodes. A common remote information node is in communication with a subscriber station and the remote information nodes in the distributed network. The common remote information node contains at least one linear hypermedia resource program consisting of pre-selected media elements from one or more hypermedia resources linked with exclusive linear links, each media element in the linear program having only one forward link
(Continued)

to the next media element. The method includes the steps of downloading and displaying a media element in the linear program and responding to user commands to download and display the next media element in the linear program.

20 Claims, 13 Drawing Sheets

Related U.S. Application Data continuation of application No. 14/728,576, filed on Jun. 2, 2015, now Pat. No. 9,772,814, which is a continuation of application No. 13/552,282, filed on Jul. 18, 2012, now Pat. No. 9,083,672, which is a continuation of application No. 13/116,421, filed on May 26, 2011, now Pat. No. 8,250,173, which is a continuation of application No. 12/426,428, filed on Apr. 20, 2009, now Pat. No. 8,250,170, which is a continuation of application No. 11/784,305, filed on Apr. 6, 2007, now Pat. No. 7,539,738, which is a continuation of application No. 10/884,187, filed on Jul. 1, 2004, now Pat. No. 7,216,155, which is a continuation of application No. 09/964,104, filed on Sep. 26, 2001, now Pat. No. 6,779,026, which is a continuation of application No. 09/680,899, filed on Oct. 6, 2000, now Pat. No. 6,330,596, which is a continuation of application No. 09/167,514, filed on Oct. 6, 1998, now Pat. No. 6,145,000.

(51) Int. Cl.
*G06F 3/0482* (2013.01)
*G06F 17/30* (2006.01)
*H04L 29/08* (2006.01)
*H04N 21/4782* (2011.01)
*H04N 21/858* (2011.01)
*G06F 3/0481* (2013.01)
*H04N 21/262* (2011.01)
*H04N 21/472* (2011.01)
*G06F 3/0484* (2013.01)
*G06Q 50/20* (2012.01)
*H04L 12/14* (2006.01)

(52) U.S. Cl.
CPC .......... *G06F 3/04842* (2013.01); *G06F 17/30* (2013.01); *G06F 17/3074* (2013.01); *G06F 17/30873* (2013.01); *G06Q 50/20* (2013.01); *H04L 67/02* (2013.01); *H04N 21/26258* (2013.01); *H04N 21/4782* (2013.01); *H04N 21/47202* (2013.01); *H04N 21/8586* (2013.01); *H04L 12/1432* (2013.01); *H04L 12/1485* (2013.01)

(58) Field of Classification Search
USPC ............. 709/201–203, 217–219, 227–229, 709/231–232, 245–246
See application file for complete search history.

(56) References Cited

U.S. PATENT DOCUMENTS

| | | |
|---|---|---|
| 5,446,891 A | 8/1995 | Kaplan et al. |
| 5,551,055 A | 8/1996 | Matheny et al. |
| 5,572,643 A | 11/1996 | Judson |
| 5,630,117 A | 5/1997 | Oren et al. |
| 5,694,594 A | 12/1997 | Chang |
| 5,708,826 A | 1/1998 | Ikeda et al. |
| 5,717,922 A | 2/1998 | Hohensee et al. |
| 5,721,911 A | 2/1998 | Ha et al. |
| 5,724,567 A | 3/1998 | Rose et al. |
| 5,727,129 A | 3/1998 | Barrett et al. |
| 5,764,908 A | 6/1998 | Shoji et al. |
| 5,774,526 A | 6/1998 | Propp et al. |
| 5,794,257 A | 8/1998 | Liu et al. |
| 5,802,299 A | 9/1998 | Logan et al. |
| 5,806,077 A | 9/1998 | Wecker |
| 5,809,247 A | 9/1998 | Richardson et al. |
| 5,812,134 A | 9/1998 | Pooser et al. |
| 5,818,439 A | 10/1998 | Nagasaka et al. |
| 5,838,906 A | 11/1998 | Doyle et al. |
| 5,848,396 A | 12/1998 | Gerace |
| 5,877,766 A | 3/1999 | Bates et al. |
| 5,884,079 A | 3/1999 | Furusawa |
| 5,890,172 A | 3/1999 | Borman et al. |
| 5,898,833 A | 4/1999 | Kidder |
| 5,920,859 A | 7/1999 | Li |
| 5,933,841 A | 8/1999 | Schumacher et al. |
| 5,937,163 A | 8/1999 | Lee et al. |
| 5,940,831 A | 8/1999 | Takano |
| 5,958,016 A | 9/1999 | Chang et al. |
| 5,983,245 A | 11/1999 | Newman et al. |
| 5,987,466 A | 11/1999 | Greer et al. |
| 5,987,501 A | 11/1999 | Hamilton et al. |
| 5,996,015 A | 11/1999 | Day et al. |
| 5,999,929 A | 12/1999 | Goodman |
| 6,009,429 A | 12/1999 | Greer et al. |
| 6,032,156 A | 2/2000 | Marcus |
| 6,032,162 A | 2/2000 | Burke |
| 6,032,196 A | 2/2000 | Monier |
| 6,035,330 A | 3/2000 | Astiz et al. |
| 6,037,935 A | 3/2000 | Bates et al. |
| 6,044,374 A | 3/2000 | Nesamoney et al. |
| 6,049,799 A | 4/2000 | Mangat et al. |
| 6,070,228 A | 5/2000 | Belknap et al. |
| 6,091,416 A | 7/2000 | Cragun |
| 6,112,212 A | 8/2000 | Heitler |
| 6,145,000 A | 11/2000 | Stuckman et al. |
| 6,151,017 A | 11/2000 | Suzuoka et al. |
| 6,151,630 A | 11/2000 | Williams |
| 6,154,771 A | 11/2000 | Rangan et al. |
| 6,182,072 B1 | 1/2001 | Leak et al. |
| 6,189,019 B1 | 2/2001 | Blumer |
| 6,212,533 B1 | 4/2001 | Tabuchi |
| 6,216,112 B1 | 4/2001 | Fuller et al. |
| 6,243,713 B1 | 6/2001 | Nelson et al. |
| 6,256,623 B1 | 7/2001 | Jones |
| 6,297,819 B1 | 10/2001 | Furst |
| 6,297,824 B1 | 10/2001 | Hearst et al. |
| 6,330,596 B1 | 12/2001 | Stuckman et al. |
| 6,341,310 B1 | 1/2002 | Leshem et al. |
| 6,360,234 B2 | 3/2002 | Jain et al. |
| 6,378,130 B1 | 4/2002 | Adams |
| 6,404,445 B1 | 6/2002 | Galea et al. |
| 6,415,281 B1 | 7/2002 | Anderson |
| 6,442,574 B1 | 8/2002 | Schumacher et al. |
| 6,448,987 B1 | 9/2002 | Easty et al. |
| 6,486,895 B1 | 11/2002 | Robertson et al. |
| 6,572,662 B2 | 6/2003 | Manohar et al. |
| 6,597,377 B1 | 7/2003 | MacPhail |
| 6,628,307 B1 | 9/2003 | Fair |
| 6,658,623 B1 | 12/2003 | Schilit et al. |
| 6,751,777 B2 | 6/2004 | Bates et al. |
| 6,772,139 B1 | 8/2004 | Smith, III |
| 6,779,026 B2 | 8/2004 | Stuckman et al. |
| 6,810,409 B1 | 10/2004 | Fry et al. |
| 6,832,355 B1 | 12/2004 | Duperrouzel et al. |
| 7,010,747 B1 | 3/2006 | Perttunen |
| 7,162,562 B2 * | 1/2007 | Chen ................... G06F 13/385 710/2 |
| 7,213,198 B1 | 5/2007 | Harik |
| 7,346,840 B1 | 3/2008 | Ravishankar et al. |
| 7,424,523 B2 | 9/2008 | Stuckman et al. |
| 7,478,144 B2 | 1/2009 | Stuckman et al. |
| 7,539,738 B2 | 5/2009 | Stuckman et al. |
| 7,555,476 B2 * | 6/2009 | Holbrook .......... G06F 17/30864 715/205 |
| 7,761,863 B2 * | 7/2010 | Illowsky .......... G06F 17/30371 709/201 |

(56) References Cited

U.S. PATENT DOCUMENTS

| | | | |
|---|---|---|---|
| 7,769,830 | B2 | 8/2010 | Stuckman et al. |
| 7,949,707 | B2 | 5/2011 | McDowall et al. |
| 8,640,160 | B2 | 1/2014 | Stefanik et al. |
| 9,083,672 | B2 | 7/2015 | Stuckman et al. |
| 9,226,655 | B2 | 1/2016 | Iwase et al. |
| 9,772,814 | B2 | 9/2017 | Stuckman et al. |
| 9,864,575 | B2 * | 1/2018 | Stuckman .............. G06F 17/30 |
| 2001/0034814 | A1 | 10/2001 | Rosenzweig |
| 2001/0049698 | A1 | 12/2001 | Hsu et al. |
| 2004/0008225 | A1 | 1/2004 | Campbell |
| 2007/0168413 | A1 | 7/2007 | Barletta et al. |
| 2010/0168413 | A1 * | 7/2010 | Indusegaram .......... C09B 47/06 540/122 |

OTHER PUBLICATIONS

Braverman; CCI Slide Show 1.0; Sep. 22, 1994; 2 pgs; http://archive.ncsa.illinois.edu/cyberia/stats/sshow-src/readme-sshow.

Chang, et al.; A Fully Automated Content-Based Video Search Engine Supporting Spatiotemporal Queries; IEEE Transactions on Circuits and Systems for Video Technology; vol. 8, No. 5; Sep. 1998; 14 pgs.

Cool Links: Overview; 1997; 3 pgs; http://web.archive.org/web/19980210201910/http://www.i-a-i.com/services/cool/overview.html.

Cool Links: Technical Overview; 1997; 2 pgs; http://web.archive.org/web/19980210201925/http://www.i-a-i.com/services/cool/technical.html.

Gloor; Elements of Hypermedia Design: Techniques for Navigation & Visualization in Cyberspace; 1997; 393 pgs; Birkhauser Boston.

Hauck; Supporting Hierarchical Guided Tours in the World Wide Web; Computer Networks and ISDN Systems 28; 1996; pp. 1233-1242.

Hauswirth; Pooh's Guided Tour Service; Nov. 11, 1995; 12 pgs; http://web.archive.org/web/19970117063457/http://www.infosys.tuwien.ac.at/GuidedTour.

Joachims; WebWatcher Demo; Sep. 15, 1997; 1 pg; http://www.cs.cmu.edu/afs/cs.cmu.edu/project/theo-6/web-agent/www/wwdemo.html.

Kistler, et al.; WebL—a programming language for the Web; Computer Networks and ISDN Systems; 1998; 14 pgs; http://wwwconference.org/www7/1832/com1832.htm.

Marshall, et al.; Guided Tours and On-Line Presentations: How Authors Make Existing Hypertext Intelligible for Readers; Hypertext '89 Proceedings; Nov. 1989; 12 pgs.

Moody; WebPath: Sharable Personalized Guided Web Tours; Lotus Technical Report 98-09; 18 pgs.

NCSA Mosaic Common Client Interface; National Center for Supercomputing Applications; Mar. 31, 1995; 2 pgs; http://www.soberit.hut.fi/tik-76/95-96/palautukset/rahi/et/cci-spec.html.

Schuler, et al.; Designing User Interfaces for Hypermedia; ESPRIT Project 6532; HIFI; vol. 1; Oct. 1994; 259 pgs.

Shipman, et al.; Guided paths through Web-based collections: Design, experiences, and adaptations. J. Am. Soc. Inf. Sci., 51; 2000; 260-272.

Shipman, III, et al.; Creating Educational Guided Paths over the World-Wide Web; In Proceedings of Ed-Telecom 96; 1996; 6 pgs; Center for the Study of Digital Libraries & Department of Computer Science. Texas A&M University, College Station, TX 77843-3112, USA.

Smith, et al.; Searching for Images and Videos on the World-Wide Web; Center for Telecommunication Research Technical Report #459-96-25; Aug. 19, 1996; 19 pgs.

Surfbot 3.0; http://web.archive.org/web/19971211151824/http://www.surflogic.com/sb30menu.html.

Surflogic LLC, Home of the Surfbot; Mar./Apr. 1997; 1 pg; http://web.archive.org/web/19970613064653/http://www.specter.com/home.html.

Walden's Paths—About the Name; Nov. 13, 2002; 2 pgs; http://www.csdl.tamu.edu/walden/about-name.html.

Walden's Paths—An Introduction to Walden's Paths for Teachers; Nov. 13, 2002; 3 pgs; http://www.csdl.tamu.edu/walden/walden-intro.html.

Walden's Paths Project Home Page; Nov. 27, 2002; 3 pgs; http://www.csdl.tamu.edu/walden/.

WebWatch 1.1 data sheet; 1995-1996; 1 pg; http://web.archive.org/web/19971211162807/http://www.surflogic.com/ww.1.x/datasheet_ww1.html.

WebWatch 1.1 Frequently Asked Questions; 1995-1996; 2 pgs; http://web.archive.org/web/19980218101324/http://www.surflogic.com/ww.1.x/faq_ww1.html.

WebWatch 1.1 Online Documentation; 1995-1996; 1 pg; http://web.archive.org/web/19980218101324/http://www.surflogic.com/ww.1.x/faq_ww1.html.

Zelleweger; Scripted Documents: A Hypermedia Path Mechanism; Hypertext '89; Nov. 5-8, 1989; 12 pgs.

*Hypermedia Navigation LLC v. Yahoo Holdings, Inc*; Notice of Motion and Motion to Dismiss Amended Complaint Pursuant to Fed. R. Civ. P. 12(b)(6) for Lack of Patentable Subject Matter Under 35 U.S.C. §101; Memorandum of Points and Authorities in Support Thereof; Case No. 4:17-cv-03188-HSG; United States District Court, Northern District of California; Filed Sep. 12, 2017; 32 pages.

"Expanding Unidirectional Ring of Pages", dated Dec. 22, 1994, obtained at the internet address: http://wombat.doc.ic.ac.uk/europa.html, printed Mar. 11, 2004, 2 pages.

"Get Looped and Get Traffic!", dated Aug. 21, 1997, obtained at the internet address:http://lists.w3.org/Archives/Public/www-lib/1997JulSep/00 I 6.html, printed May 29, 2003, 2 pages "Targeted EMAG Advertising", dated Aug. 19, 1997, obtained at the internet address: http://lists.w3.org/Archives/Public/www-lib/1997JulSep/001 4. html, printed May 29, 2003.

*Hypermedia Navigation LLC V. Yahoo!, Inc.*; Notice of Motion and Motion to Dismiss Pursuant to Fed. R. Civ. P. 12(c) for Lack of Patentable Subject Matter Under 35 U.S.C. Section 101; Memorandum of Points and Authorities in Support Thereof; Case No. 4:17-cv-03188-HSG; In the United States District Court, Northern District of California; Filed Jun. 26, 2017; 28 pages.

IBM Technical Disclosure Bulletin, "Publicly Accessible Web Pages with Restricted Direct Links Access,"vol. 40, No. 1, p. 179-180, Published Jan. 1997, 3 pages.

Internet Article: "Information Retrieval and Organization", http://www.haifa.il.ibm.com/241Infor.htm, dated May 18, 1998, 1 page.

Internet Article: "Organizing documents to support browsing in digital libraries", http://edfu.lis.uiuc.edu/allterton/95/s4/maarek.html, dated May 18, 1998, 4 pages.

Internet Article: Java-Based Apps—Mapuccino:, http://www.ibm.com/java/mappucion; dated May 18, 1998, 1 page.

Marlatt, Andrew, "'Web Rings' Emerge as Alternative to Search Engines", dated Oct. 20, 1997, obtained at the internet address: http;//uhoh.org/internet.sub.--dot.sub.--com.sub.-19971020.htm, printed Mar. 11, 2004, 3 pages.

McKean, Maureen, Web Rings: Raising the Bar on Web Searches, dated 1997, obtained at the internet address: http:/1webserver.cpg.comlfeatures/fl12.11l, printed May 22, 2003, 3 pages.

Tim Oren, Gitta Salomon, Kristee Kreitman and Abbe Don, Publication entitled:Guides: Characterizing the Interface; pp. 1-9; Believed to have been published before Oct. 6, 1998, 5 pages.

Wall Street Journal Article, "A Guide to the Web", May 28, 1998, p. B7, 1 page.

Shipman et al., Using Networked Information to Create Educational Guided Paths, Int'l Journal Educ. Telecomms. (Jul. 1997) ("Guided Paths").

Furuta et al., Hypertext Paths and the World-Wide Web: Experiences with Walden's Paths, Association for Computing Machinery—Hypertext 97 (Jul. 1997) ("Hypertext Paths").

Shipman et al., Generating Web-Based Presentations in Spatial Hypertext, Association for Computing Machinery—Intelligent User Interfaces (Jan. 1997) ("Web-Based Presentations").

* cited by examiner

SYSTEM AND METHOD FOR CREATING AND NAVIGATING A LINEAR HYPERMEDIA RESOURCE PROGRAM

CROSS REFERENCE TO PRIORITY APPLICATIONS

The present U.S. Utility Patent Application claims priority pursuant to 35 U.S.C. § 120 as a continuation of U.S. Utility application Ser. No. 15/681,714, entitled "SYSTEM AND METHOD FOR CREATING AND NAVIGATING A LINEAR HYPERMEDIA RESOURCE PROGRAM,", filed Aug. 21, 2017, which is a continuation of U.S. Utility application Ser. No. 14/728,576, entitled "SYSTEM AND METHOD FOR CREATING AND NAVIGATING A LINEAR HYPERMEDIA RESOURCE PROGRAM", filed Jun. 2, 2015, issued as U.S. Pat. No. 9,772,814 on Sep. 26, 2017, which is a continuation of U.S. Utility application Ser. No. 13/552,282, entitled "SYSTEM AND METHOD FOR CREATING AND NAVIGATING A LINEAR HYPERMEDIA RESOURCE PROGRAM", filed Jul. 18, 2012, issued as U.S. Pat. No. 9,083,672 on Jul. 14, 2015, which is a continuation of U.S. Utility application Ser. No. 13/116,421, entitled "SYSTEM AND METHOD FOR CREATING AND NAVIGATING A LINEAR HYPERMEDIA RESOURCE PROGRAM", filed May 26, 2011, issued as U.S. Pat. No. 8,250,173 on Aug. 21, 2012, which is a continuation of U.S. Utility application Ser. No. 12/426,428, entitled "SYSTEM AND METHOD FOR CREATING AND NAVIGATING A LINEAR HYPERMEDIA RESOURCE PROGRAM", filed Apr. 20, 2009, issued as U.S. Pat. No. 8,250,170 on Aug. 21, 2012, which is a continuation of U.S. Utility application Ser. No. 11/784,305, entitled "SYSTEM AND METHOD FOR CREATING AND NAVIGATING A LINEAR HYPERMEDIA RESOURCE PROGRAM", filed Apr. 6, 2007, issued as U.S. Pat. No. 7,539,738 on May 26, 2009, which is a continuation of U.S. Utility application Ser. No. 10/884,187, entitled "SYSTEM AND METHOD FOR CREATING AND NAVIGATING A LINEAR HYPERMEDIA RESOURCE PROGRAM", filed Jul. 1, 2004, issued as U.S. Pat. No. 7,216,155 on May 8, 2007, which is a continuation of U.S. Utility application Ser. No. 09/964,104, entitled "SYSTEM AND METHOD FOR CREATING AND NAVIGATING A LINEAR HYPERMEDIA RESOURCE PROGRAM", filed Sep. 26, 2001, issued as U.S. Pat. No. 6,779,026 on Aug. 17, 2004, which is a continuation of U.S. Utility application Ser. No. 09/680,899, entitled "SYSTEM AND METHOD FOR CREATING AND NAVIGATING A LINEAR HYPERMEDIA RESOURCE PROGRAM", filed Oct. 6, 2000, issued as U.S. Pat. No. 6,330,596 on Dec. 11, 2001, which is a continuation of U.S. Utility application Ser. No. 09/167,514, entitled "SYSTEM AND METHOD FOR CREATING AND NAVIGATING A LINEAR HYPERMEDIA RESOURCE PROGRAM", filed Oct. 6, 1998, issued as U.S. Pat. No. 6,145,000 on Nov. 7, 2000, all of which are hereby incorporated herein by reference in their entirety and made part of the present U.S. Utility Patent Application for all purposes.

BACKGROUND OF THE INVENTION

The World Wide Web (the "Web") provides an alternative source of information for consumers and business users. Some users also view the Web as a source of entertainment. Surfing the Web, cybercafes, etc. appeal to the sophisticated Web user as a way of having a good time.

Many Americans raised in the television age view entertainment as a serial event. Specifically, generations of viewers have experienced television shows, movies, radio programs, and concerts which all proceed linearly from a beginning to an end. Some potential Web users of this generation view surfing the Web as intimidating from perhaps two respects: (1) the use of technology; and (2) the increasingly unorganized, virtually unlimited number of choices that are available. The Web is not inherently a linear entertainment medium. A Web user may typically go directly from any given site to a large number of other sites. At best, some websites provide links to similar sites, however they typically do not offer more than a cursory indication of what the linked sites contain.

In addition, even sophisticated Web users are often frustrated by the amount of useless, undesirable material that appears on the Web. Take, for example, a user who wishes to look at pictures of classic automobiles. A search on classic automobiles may yield 10,000 hits. A website-by-website search for interesting material may yield many sites that do not meet the user's expectations as to the content, properties or quality. Some sites may be a single page that prompts a user to order a catalog. Other sites may have text but no pictures.

Accordingly, there is a need for creating entertaining Web programs that appeal to a wide cross section of potential viewers.

DETAILED DESCRIPTION OF PRESENTLY PREFERRED EMBODIMENTS

The present invention addresses the need for creating and navigating entertaining Web programs that filter out unwanted information and present desired information in a series of linearly linked websites. In one embodiment of the present invention, a user starts with the first site and in a guided tour fashion, when finished, is directed exclusively to the second site. When done with the second site, the user is directed exclusively to the next site, etc. The progression of sites defines a programmed linear hypermedia resource path that is geared towards the entertainment of the user. Users may also implement the system and method described in more detail below for educational purposes or as a research tool.

Figure 1:
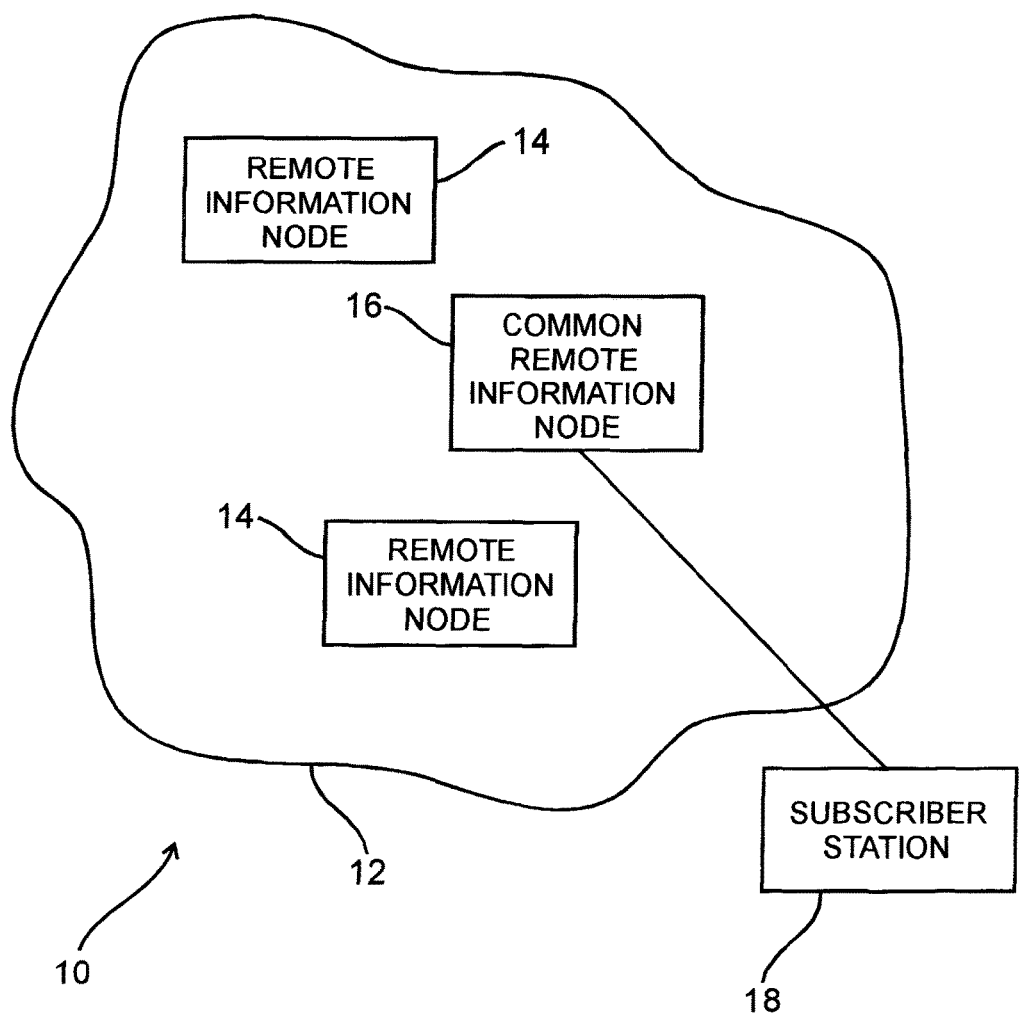
FIG. 1 is a diagram of a system for use in creating and navigating a linear hypermedia resource program according to a preferred embodiment.

Referring to FIG. 1, a system 10 for use in navigating and generating a linear hypermedia resource program is shown. The system 10 includes a distributed hypermedia data network 12 having a plurality of information nodes 14 and a common remote information node 16 all in communication with each other. A subscriber station 18 is in communication with the common remote information node 16 over a communication line. In one embodiment, the distributed hypermedia data network 12 may be the Web where the information nodes and common remote information node 14, 16 are servers, memory devices, personal computers, or the like that are capable of storing, processing, and exchanging data with other information nodes. The subscriber station 18 may be a personal computer or other device having capability of communicating with the common remote information node 16 and presenting audio, visual, or tactile information received from the common remote information node 16.

Figure 2:
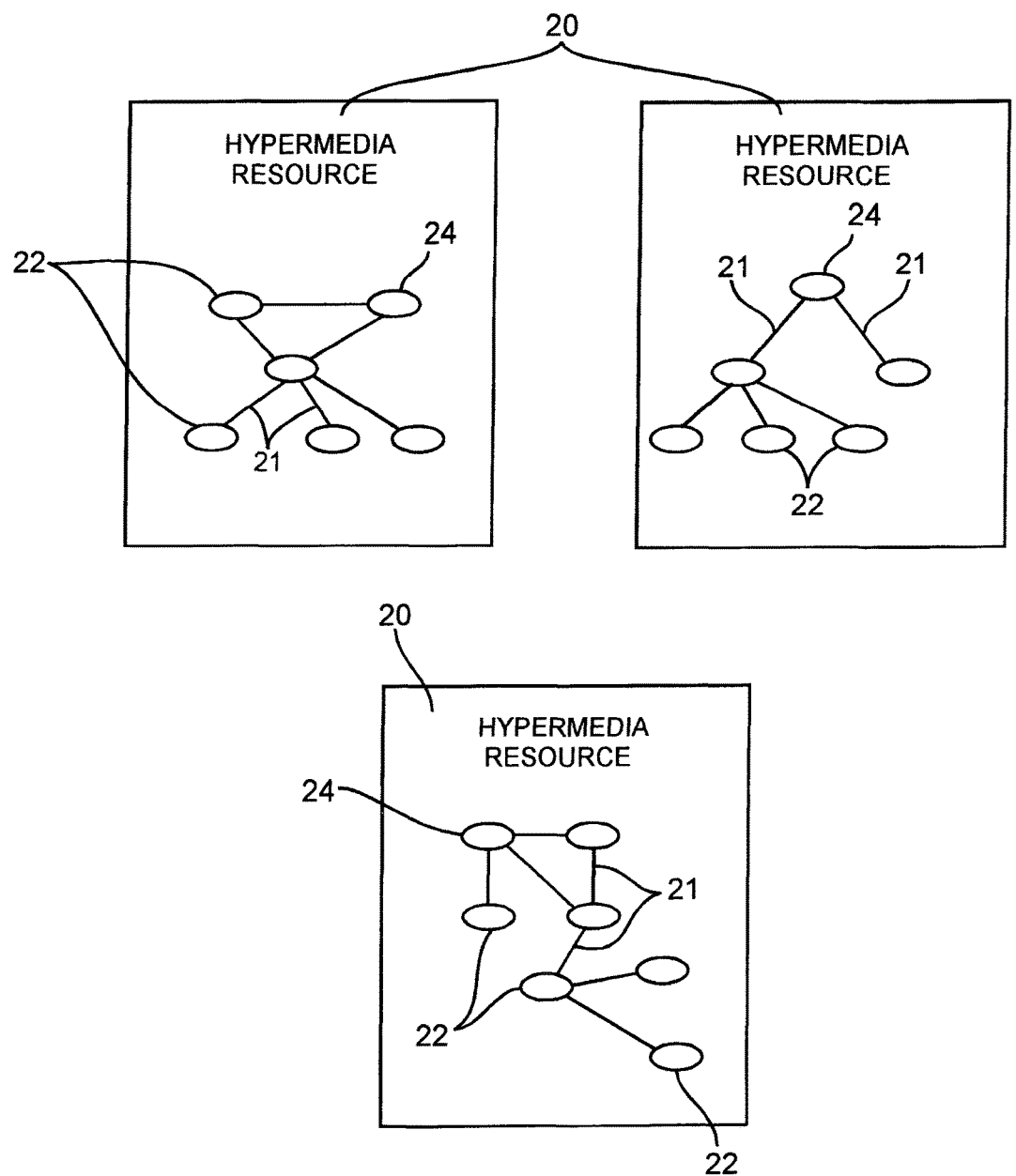
FIG. 2 illustrates hypermedia resources that may reside on information nodes in the distributed hypermedia network of FIG. 1.

As shown in FIG. 2, each information node may contain a plurality of hypermedia resources 20. Each hypermedia resource 20 contains a plurality of individual media elements 22, including a base media element 24, that are associated by an indexed tree 21. In one embodiment, each hypermedia resource 20 may be a website on the Web. The base media element 24 can comprise a selected Web page of the website that serves as a logical entry point to the website. The plurality of other media elements 22 can include the additional pages of the website along with other media that may include audio and video clips and, optionally, tactile records that are convertible to tactile information by means of a user interface device that includes tactile or force feedback. Each of the information nodes 14 in the distributed hypermedia data network 12 may contain one or more hypermedia resources 20.

Figure 3:
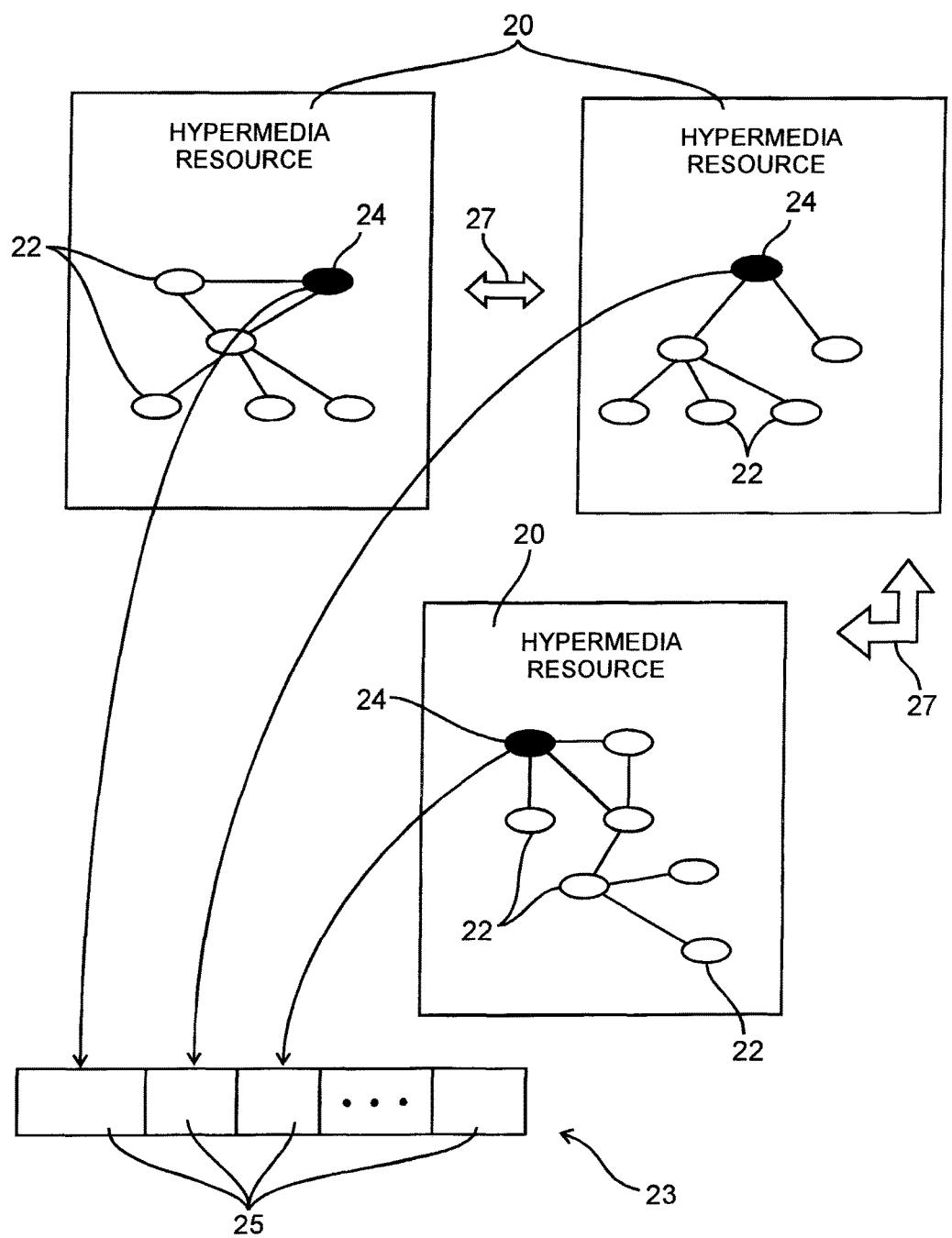
FIG. 3 diagrammatically illustrates a linear hypermedia resource program and the selected base media elements in each of the desired hypermedia resources of the hypermedia resource data network.

Unlike a typical search result from an Internet search engine on the Web, a linear hypermedia resource program includes a selected group of media elements that are associated by a series of exclusive forward and backward links that are, in one embodiment, accessible at all times as the hypermedia resources are browsed. FIG. 3 pictorially represents an embodiment of a preferred linear hypermedia resource program in the context of the media element or elements in hypermedia resources connected by the linear hypermedia resource program 23. As shown in FIG. 3, a linear program may include a selected base media element from each of a number of hypermedia resources of interest. Each base media element 24 is placed in a particular program element 25 in the linear hypermedia resource program 23 such that the program will move the user between hypermedia resources in a predetermined manner along an exclusive chain of linear links 27, each selected base media element having one exclusive forward link and one exclusive backward link. Each program element 25 maybe a media element 22 from a hypermedia resource 20. In one embodiment, the program element 25 maybe the universal resource locator (URL) for each selected media element 24. In an alternative embodiment, each program element 25 may be the entire content of a base media element 24.

Preferably, the program elements 25 of a linear hypermedia resource program 23 are stored in the common remote information node 16 controlled by the internet service provider used by a subscriber at a subscriber station 18 (FIG. 1). To accelerate the accessibility of each program element in a linear hypermedia resource program, each program element is preferably fully cached in the common remote information node so that all the information of the media element comprising each program element is retrieved prior to executing the linear hypermedia resource program. In this manner, variations in communication speeds between the common remote information node 16 and the information nodes 14 containing selective hypermedia resources are minimized. As mentioned above, each media element making up a program element may contain textual, visual, audio and tactile information. The program elements 27 of the linear hypermedia resource program may each come from a different hypermedia resource, the same hypermedia resource, or a combination of the two.

Figure 4:
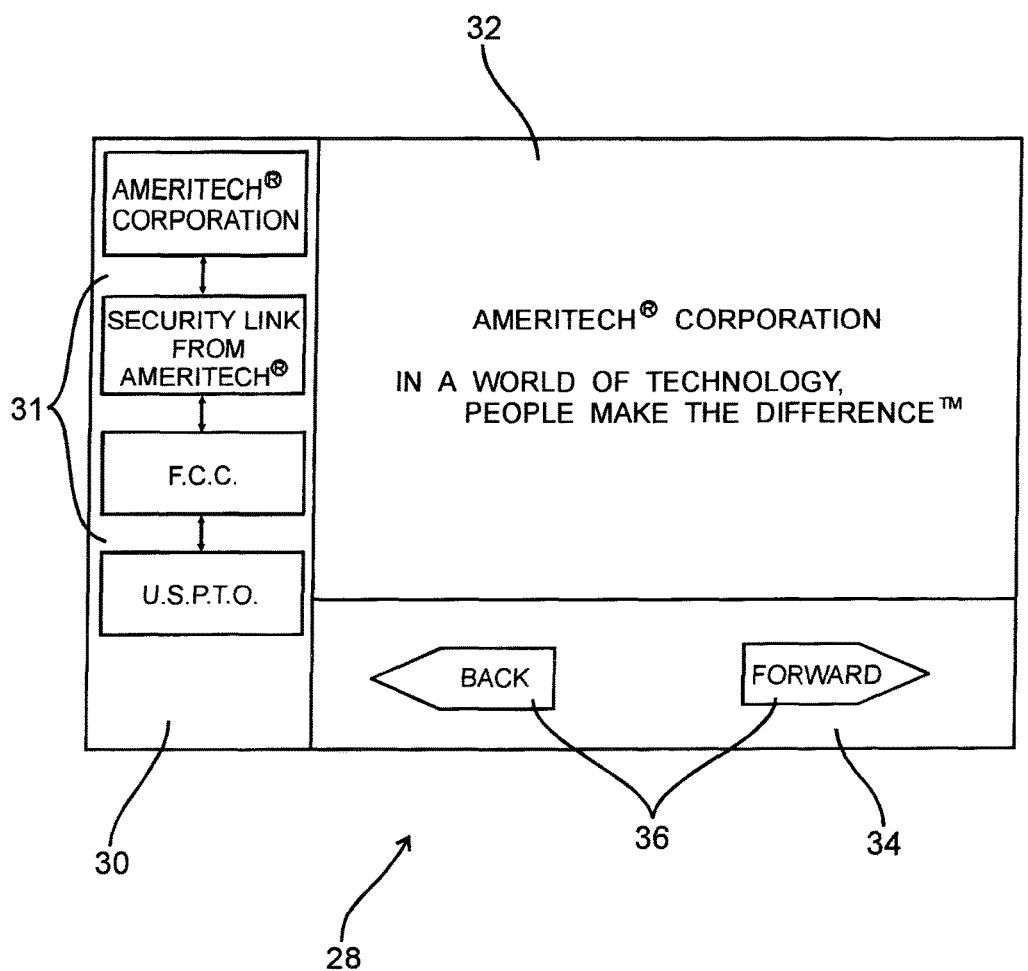
FIG. 4 illustrates a user interface for use in navigating a hypermedia resource program in accordance with one embodiment of the present invention.

FIG. 4 illustrates a preferred embodiment of a user interface operable by a user at a subscriber station 18 to view a linear hypermedia resource program. Preferably the user interface 28 comprises a collection of areas 30, 32, 34 that each provide a user with separate functionality. A map area 30 displays information representative of media elements in the linear program for all or a portion of the media elements 22 in the order arranged in the linear hypermedia resource program. This information representative of the media elements that make up the program elements of the linear program may be text, icons, graphical depictions or other indicators capable of conveying the subject of the represented media element. The map area 30 may display the entire linear path comprised of all the elements in the linear program or simply a linear segment 31 of the entire linear path. A display area 32 shows the contents of a selected media element in the linearly linked chain of the hypermedia resource program. A command area 34 preferably contains backward and forward directional buttons 36 that allow a user to send signals to the common remote information node to change the media element displayed in the display area 32 to a subsequent or previous media element in the linear hypermedia resource program as shown in the map area 30. In one embodiment of the present invention, any or all of the areas 30, 32 and 34 are implemented using Web frames. Dynamic pages that utilize templates and tables are alternative implementations of the areas 30, 32 and 34 described above.

Figure 5:
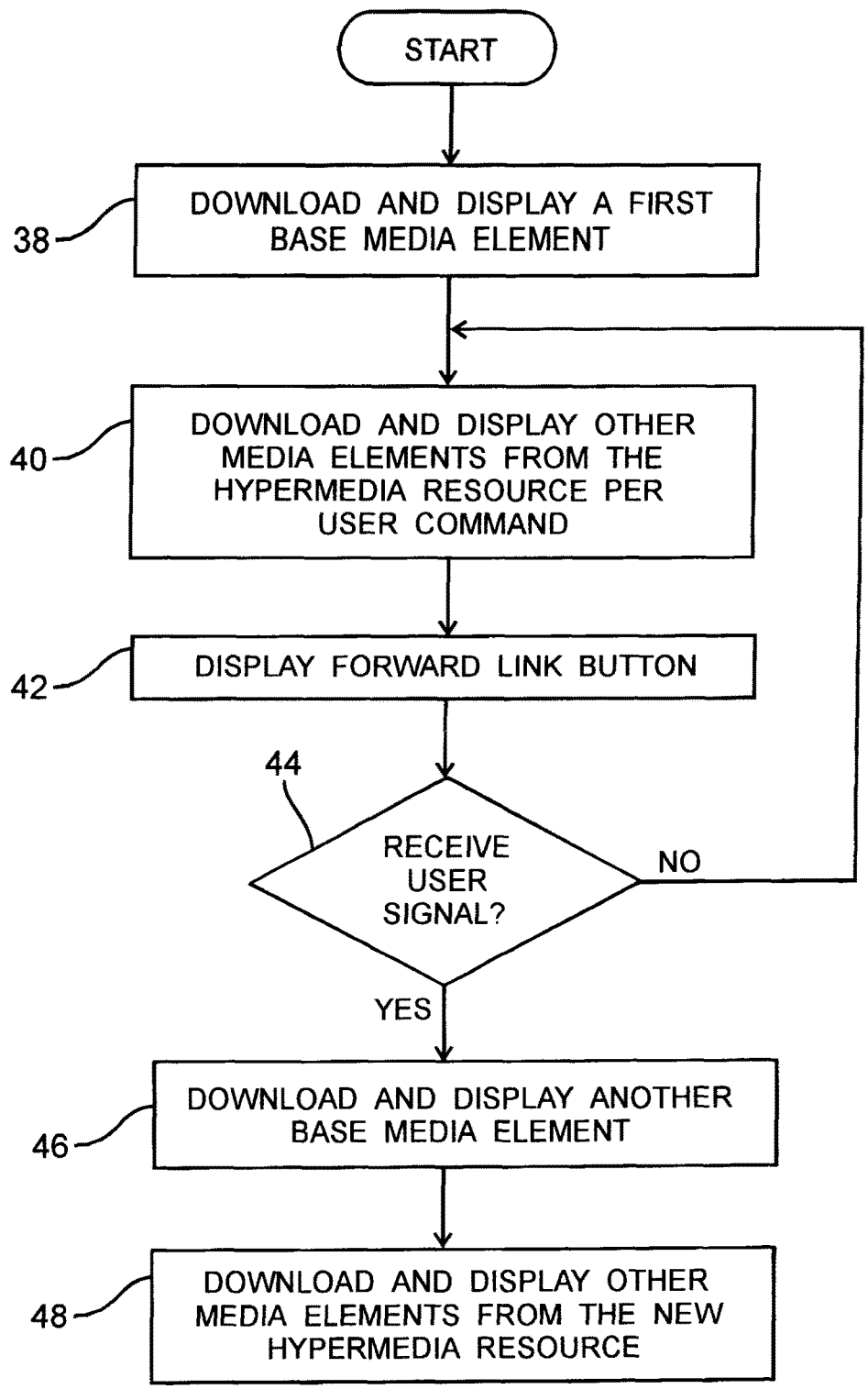
FIG. 5 is a flow diagram of a method for navigating a linear hypermedia resource program.

Utilizing the system of FIGS. 1-2 and 4, methods for navigating and creating a linear hypermedia resource program are described below. Referring to FIG. 5, one preferred embodiment of a method of navigating a linear hypermedia resource program is shown. A user may download and display a first base media element in the linear hypermedia resource program (at step 38). In one embodiment, the contents of each program element of the linear hypermedia resource program are cached in memory at the common remote information node. The system, via the user interface 28, responds to additional user commands to download and display other media elements of the first hypermedia resource (at step 40). Although the entire hypermedia resource from which one or more media elements were preselected as program elements may also be cached at the common remote information node 16, the media elements that do not make up the linear hypermedia resource program are preferably accessed using links to the respective remote information node containing the hypermedia resource.

A forward direction button 36 is displayed to the user on the display device of the subscriber station 18 and the subscriber station receives a first signal in response to an action of the user that indicates an activation of the forward link button (at steps 42, 44). If a signal is received indicating that the user has selected the forward directional button, a second base media element is downloaded and provided to the subscriber station (at step 46). As with the first hypermedia resource, the user may download and display selected media elements from the second hypermedia resource until satisfied (at step 48). The steps of responding to the user command to display a base media element of a hypermedia in a linear hypermedia resource program and, in response to subsequent commands of a user, to download and display other media elements from that hypermedia resource may be repeated many times. In this fashion, the user can traverse all of the program elements of the linear hypermedia resource program including all of the base media elements and any desired media elements of each hypermedia resource.

By way of an example for implementing the method described above and shown in FIG. 5, consider a linear hypermedia resource program directed to hypermedia resources on the Internet related to a television celebrity. In this example, the linear hypermedia resource program 23 is an Internet Web path implemented by an internet service provider at a common remote information node 16. The user starts on the Web path at the first website, for example, a website showing a type of automobile driven by the celebrity along with specifications and prices. The presentation of the website is within the display area 32 of the user interface 28. Outside the display area 32, a map area 30 showing other sites along the celebrity Web path is displayed and identifies the current site. In one embodiment of the present invention, a map of the entire linear path is presented. In an alternative embodiment, a selected linear segment 31 of the map is shown. In this fashion, the user (by means of map zoom-in and zoom-out buttons not shown) can select a portion of the map of selected size to view by zooming into a particular site and reviewing it with more detail or zooming out and reviewing the map with more sites but with optionally less detail being displayed per site. In a further alternative, a user, by means of highlighting and selecting a particular program element from the map area 30, can selectively skip forward or backward to a particular program element and its corresponding base media element.

The user can activate the forward direction button 36 to go to a second web site on the tour. The second website may display subject matter relevant to the real life of, or a movie character portrayal by, the celebrity. If, for example, the celebrity was known to smoke cigars, a cigar store website having a variety of cigars for sale via mail order can be displayed. As the user progresses through the linear program, the user may come across a website having little appeal to the user and so the user may simply hit the forward direction button 36 to proceed along to the next in the serially linked series of websites. In addition, a skip next button (not shown) can likewise allow a user to skip the next program element in the linear program 23 and proceed directly to the program element after the next program element. The remaining program elements 25 in the linear program 23 can include website pages for Broadway plays the celebrity acted in, vacations in exotic locations associated with the celebrity, pictures of the celebrity in favorite roles, and so on.

It should be noted that, in one embodiment of the present invention the user is free to engage hyperlinks that are present in each hypermedia resource. This allows the user to browse any of the individual hypermedia elements of the hypermedia resource as well as other linked hypermedia resources that may not be on the linear path. In this embodiment, the activation of the forward or back buttons directs the user to the next or previous hypermedia resource, respectively, and therefore allows the user to return to the path provided by the linear program 23.

Figure 6:
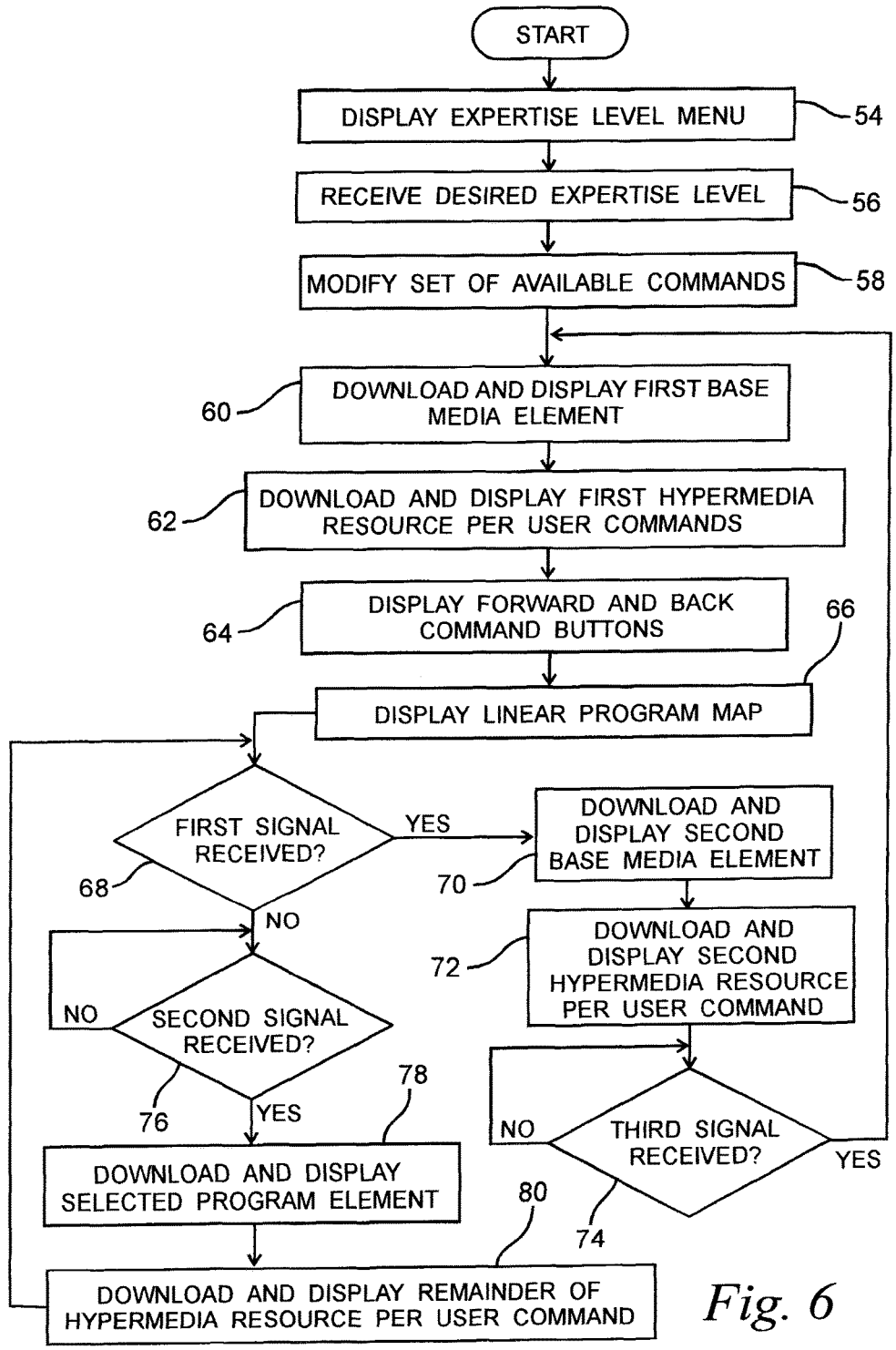
FIG. 6 is a flow diagram illustrating an alternative method for navigating a linear hypermedia resource program in accordance with one embodiment of the present invention.
Figure 7:
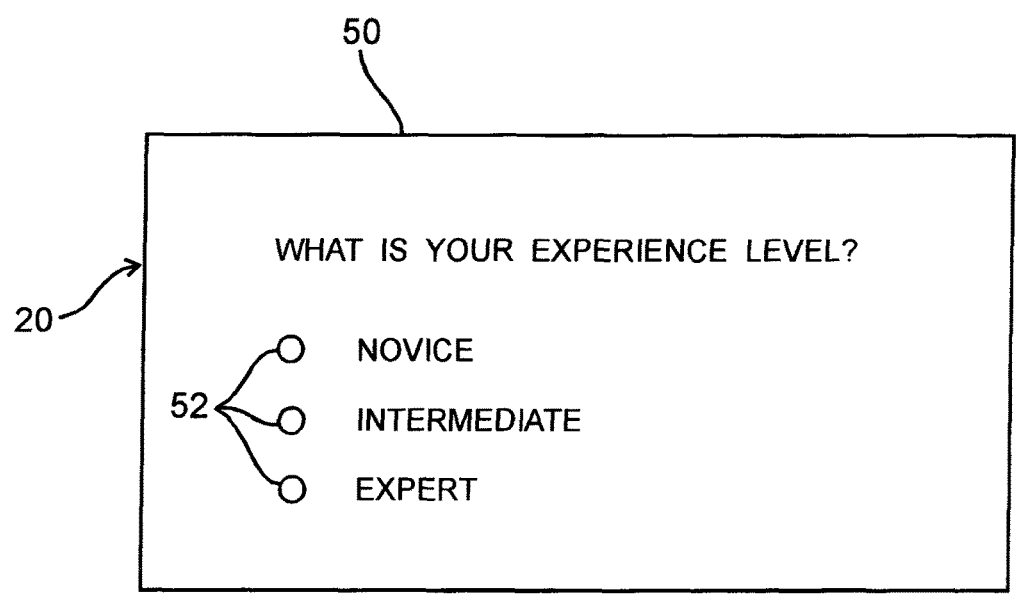
FIG. 7 illustrates a user interface for prompting a user for an experience level in accordance with one embodiment of the present invention.

FIG. 6 shows an alternative embodiment of the method illustrated in FIG. 5. In this embodiment, the common remote information node 16 solicits the user for an experience level. The user interface 28 preferably contains a user experience level screen 50 that inquires as to a user's experience level in browsing hypermedia resources such as the Web. The experience level screen 50 provides an experience level menu having multiple experience level indicators 52 (see FIG. 7). In the embodiment of FIG. 6, the system displays the experience level menu and receives a desired experience level instruction from the user (at steps 54, 56). Upon receipt of the selected experience level, the common remote information node modifies the set of available commands to accord with the desired experience level (at step 58).

In one embodiment, selection of a beginner experience level disables all links appearing on media elements in the linear hypermedia resource program. This feature discourages users from leaving the path defined by the program and becoming lost in cyberspace. In an alternative embodiment, the step of modifying the set of available commands may include disabling Web links between hypermedia resources 20 and only allowing a user to peruse media elements 22 within a selected hypermedia resource 20 until the next hypermedia resource 20 in the linear hypermedia resource program is selected through the forward or back direction buttons 36 in the user interface 28.

After selecting the experience level and modifying the set of available commands, the method proceeds in much the same way as described in FIG. 5. The system downloads and displays a first base media element (at step 60) and downloads and displays selected media elements from the first hypermedia resource per user commands (at step 62). The node 16 displays the forward and back buttons 36 (at step 64) and displays the linear program map 30 on the user interface 28 (at step 66). The node 16 waits to receive a next signal from the user (at step 68) and displays the second base media element of the second hypermedia resource in a linear hypermedia program if a first signal is received (at step 70). The common remote information node 16 will then download and display selected media elements from the second hypermedia resource as directed by user commands received at the user interface (at step 72). The user then may decide to use the back button to send the signal to the system that returns to the previous hypermedia resource (at step 74). Alternatively, if after displaying the first base media elements of the first hypermedia resource the user selects an alternative command such as by selecting a particular program element from the map area 30, the system recognizes that command and downloads and displays the base media element that corresponds to the selected program element (at steps 76, 78). The system will subsequently download and display any selected hypermedia resources chosen by the user (at step 80).

While FIG. 6 describes the operation of the present invention in the context of one embodiment including a first and second hypermedia resource, one of ordinary skill in the art, based on the teachings herein, will recognize that this method will similarly apply to a linear program 23 of arbitrary length. Further, while the step of displaying the linear program map is shown as a discrete step, the display of the program map can persist during the operation of the method described above and can be updated after each new program element is selected for displaying the user's position in the linear program. In addition, the back and forward command buttons can likewise be persistently displayed during the operation of the program.

Figure 8:
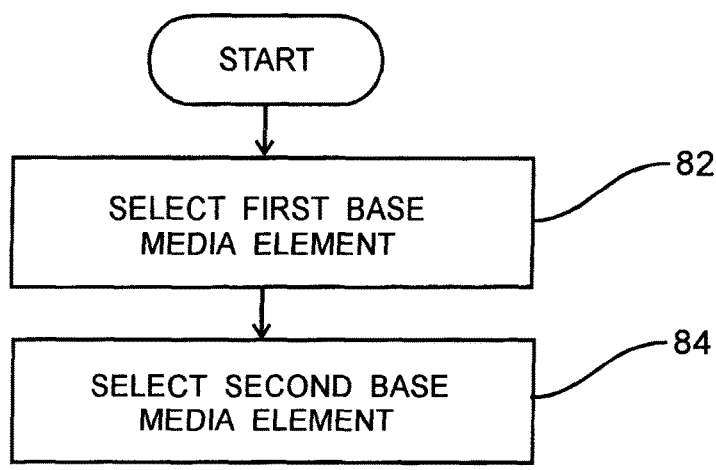
FIG. 8 illustrates a method of generating a linear hypermedia resource program utilizing the system of FIG. 1 in accordance with one embodiment of the present invention.

According to another aspect of the invention, in one embodiment a user at a subscriber station 18 may utilize software at the common remote information node 16 to generate a linear hypermedia resource program. As shown in FIG. 8, a user may be browsing a distributed hypermedia data network, such as the Web, and simply select a first base media element of a desired hypermedia resource (at step 82) and then proceed to select a base media element for a subsequent hypermedia resource (at step 84). The progression of selecting base elements for desired hypermedia resources may continue until the user has accumulated a desired number of base media elements. At the conclusion of selecting individual base media elements, the user is left with a sequence of exclusively linked hypermedia resources that may be saved for future perusal. Thus, the linear hypermedia resource program provides advantages over standard bookmark functions available on Internet Web browsers because an entire sequence of web sites/Web pages having an exclusive linear path may be saved. Additionally, the entire content of each media element (such as a Web page) selected may be cached in a memory at the common remote information node operated by the internet service provider (ISP) to accelerate later retrieval of information.

Figure 9:
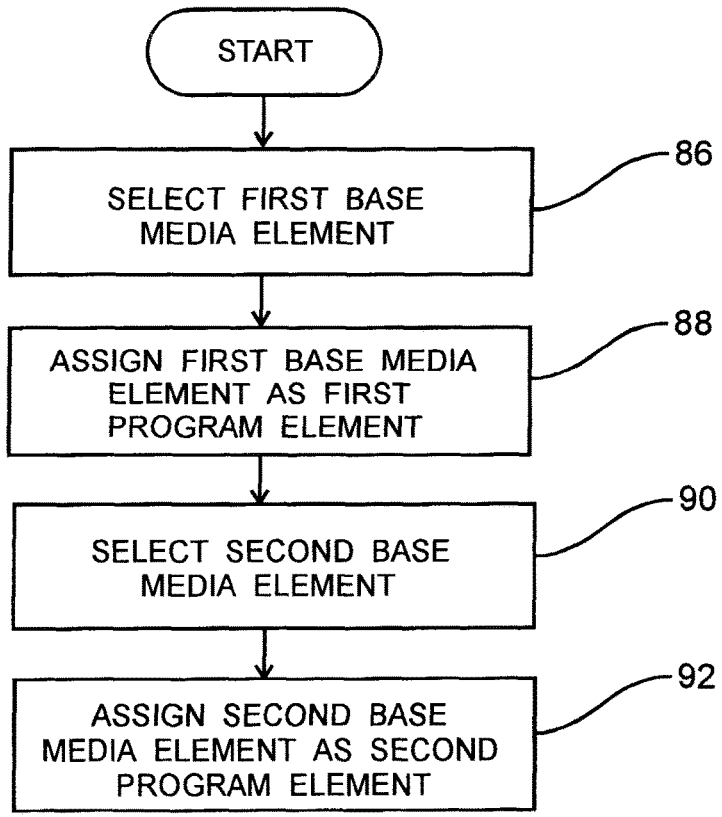
FIG. 9 illustrates an alternative embodiment of a method of generating linear hypermedia resource program.
Figure 10:
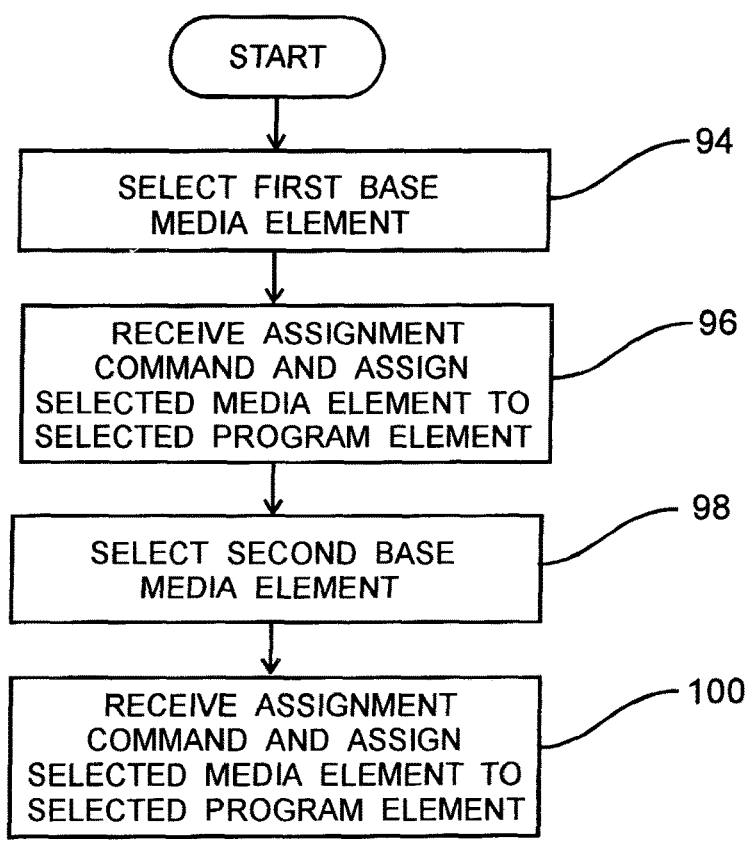
FIG. 10 is a flow diagram illustrating a third embodiment of a method for generating a linear hypermedia resource program.

As shown in FIG. 9, an alternative embodiment of the method shown in FIG. 8 includes the ability to selectively place desired media elements in desired positions in the linear hypermedia program. Referring to FIGS. 9 and 10, a user may select the first base media element (at step 86) and then assign the first base media element to a first program element in the linear hypermedia program (at step 88). A second base media element may then be selected and assigned to a second program element of the linear hypermedia program (at steps 90, 92). Alternatively, a preferred embodiment allows the user to select a first base media element and provide an editing command to the system that assigns the first base media element to a selected program element position (at steps 94, 96). A later base media element can be selected and the system will receive a command to assign this later selected base media element to another selected program element position that may precede or follow the previously selected base media element in the linear hypermedia resource program 23 (at steps 98, 100).

Figure 11:
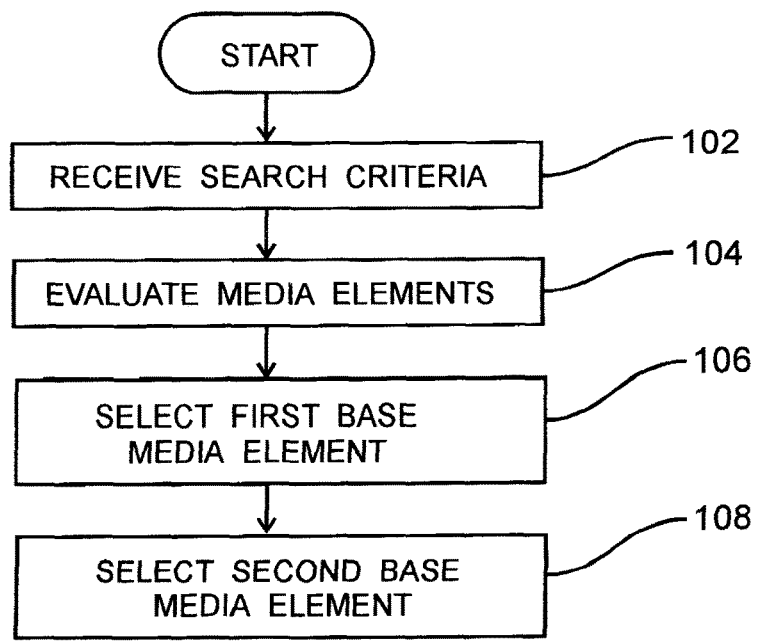
FIG. 11 is a flow diagram illustrating a fourth embodiment of a method for generating a linear hypermedia resource program.

FIG. 11 shows another embodiment of a method for generating a linear hypermedia resource program. Rather than manually allowing a user to select media elements for inclusion in the linear program elements of the linear hypermedia resource program, a user may communicate search criteria to a linear hypermedia program service at a remote location. In one embodiment of the present invention, such as the celebrity application described above, Web paths may be created by a professional director from pre-existing or newly created web sites or a combination of both. In an alternative embodiment, the Web paths may be created by an intelligent agent that operates independently of the user and responds to the user's suggested topics, likes and dislikes, as well as user preferences concerning content, properties and quality of websites. This service may be offered by the ISP at the common remote information node 16.

When the search criteria are received at the node 16, the professional director or intelligent agent may evaluate media elements to select and organize, in an exclusive linearly linked fashion, highly relevant media elements satisfying the user's search criteria (at steps 102-108). For example, a user interested in shopping for furniture on the Web specifies the types of furniture in which he or she is interested (e.g., Chippendale breakfront mahogany china cabinets), and the type of websites desired (e.g., furniture stores with websites that show JPEG or MPEG images of the furniture with prices for each piece). Examples of other suitable file formats are any of a number of known graphics, video, audio and tactile data formats. Preferably, the user has the appropriate hardware and software at the subscriber station to interpret the electronic media element content into the video, audio, or tactile domain. A user also preferably designates file information content choices in the search criteria. File information content may be used to filter for Web pages that contain price listings or have the ability to place secure product orders via credit card. Many other file criteria may be used to select appropriate media elements. For example, a user can also specify that information must be presented in a certain language, that suitable websites must have been updated within a predetermined period, and so on.

The user may optionally specify the time frame for generating a desired linear hypermedia resource program. For example, the user may request that the linear hypermedia resource program be ready by Friday night that week. The intelligent agent or professional director works off-line of the user to create a series of links that define a desirable path through a series of websites that meet the user's criteria. Once complete, the linear hypermedia resource program (in this example a serial path of website pages from one or more websites) is delivered to the user by HTTP or email. The common remote information node may automatically notify the user that the program is ready or may wait for the user to retrieve it.

Figure 12:
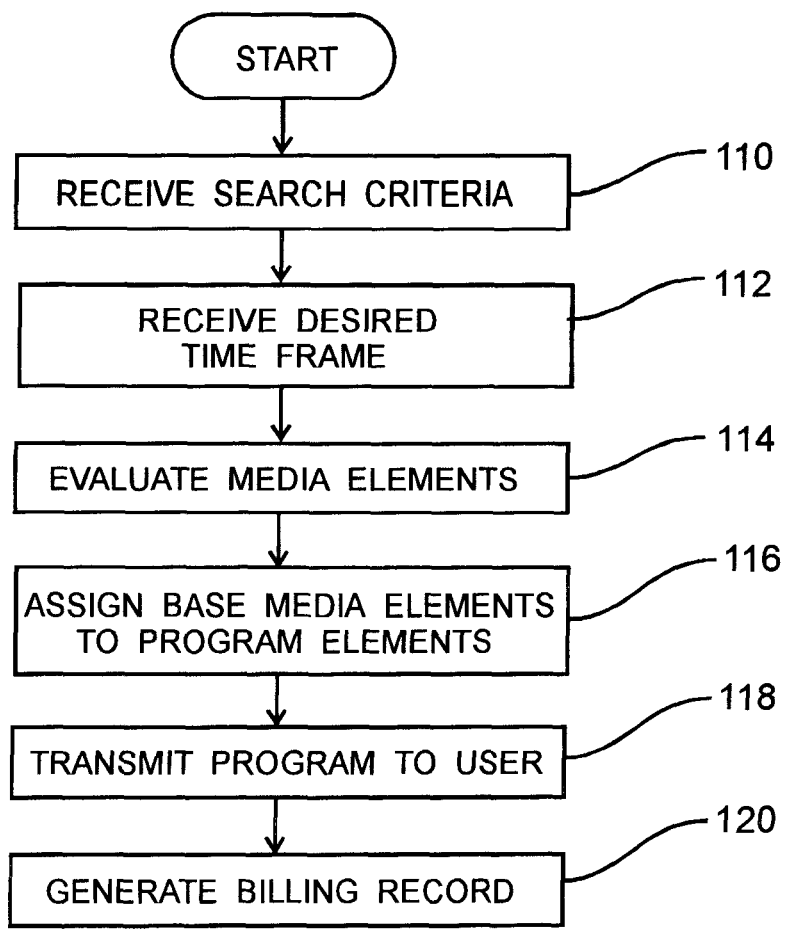
FIG. 12 is a flow diagram of a method for generating a linear hypermedia resource program in billing a user.

Internet service providers, or other linear hypermedia program sources offering users custom-made linear hypermedia resource programs, may offer linear hypermedia resource programs of different lengths and quality. In order to accommodate different needs and budgets, a method for generating a desired linear hypermedia resource program and accounting for billing information is useful. As FIG. 12 illustrates, a user at a subscriber station 18 initially sends a search request with specific search criteria to the common remote information node operated by the ISP (at step 110). The search criteria preferably include the time frame in which the user desires to receive the linear hypermedia program. A sliding scale of cost versus time, in the form of an algorithm or table stored in memory at the common remote information node, may then be applied to determine the final cost of generating the linear hypermedia resource program (at step 112). The media elements available in the distributed hypermedia data network are then analyzed in light of the search criteria (at step 114).

As described above, the step of evaluating the media elements may be done with an intelligent agent such as a search engine with artificial intelligence capabilities, or may be done manually by personnel at the Internet service provider. Base media elements are then selected from the pool of relevant hypermedia resources and then assigned to program element positions in the linear hypermedia resource program (at step 116). The resulting linear hypermedia resource program is then transmitted from the common remote information node to the subscriber station (at step 118) and a billing record is also generated at the common remote information node of the Internet service provider in accordance with the time frame requested and scope of the search (at steps 120). Factors such as processor time, memory requirement for the linear program, or storage period at a server such as the common remote information node may also be incorporated into the billing record.

Figure 13:
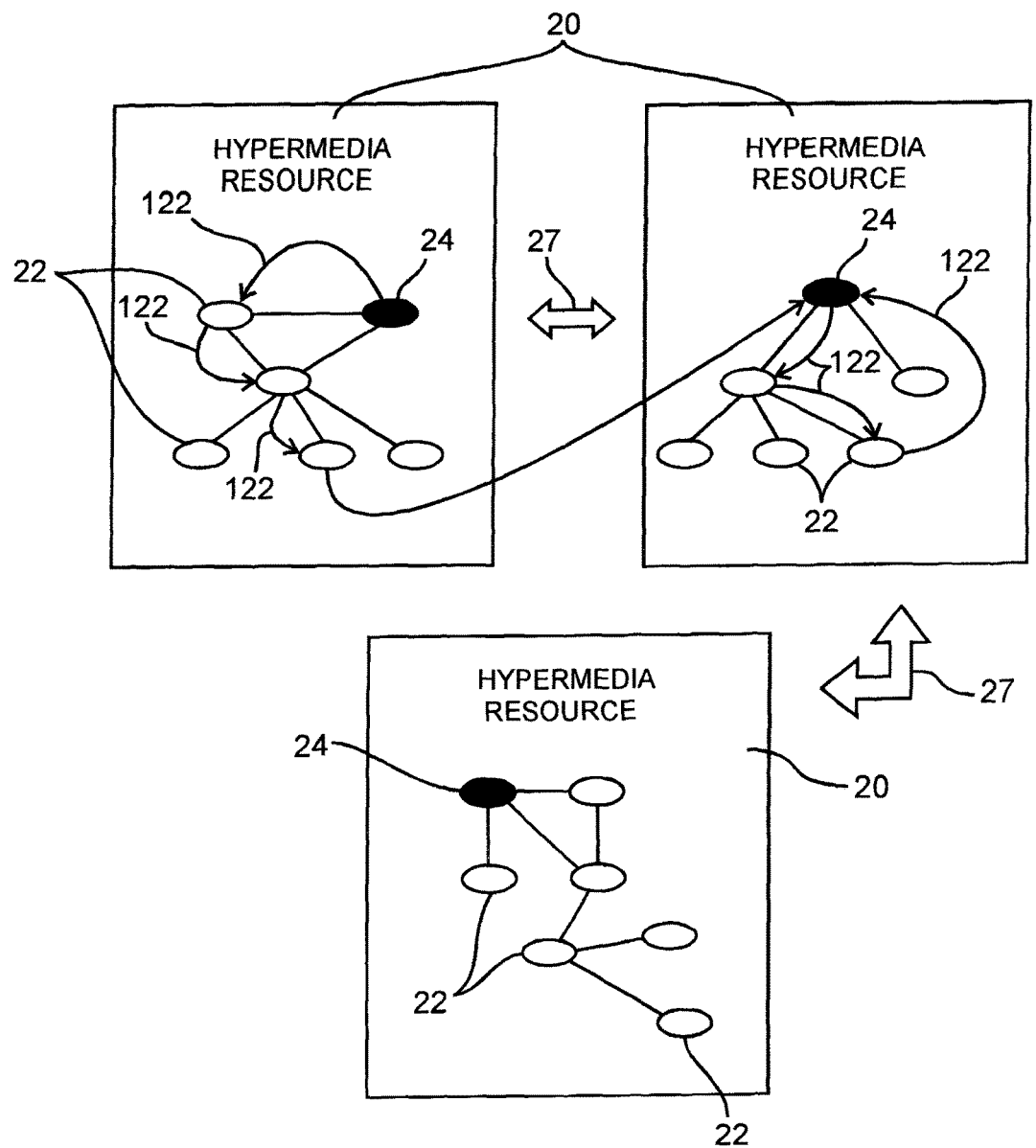
FIG. 13 diagrammatically illustrates one preferred embodiment of navigating a linear hypermedia resource program.
Figure 14:
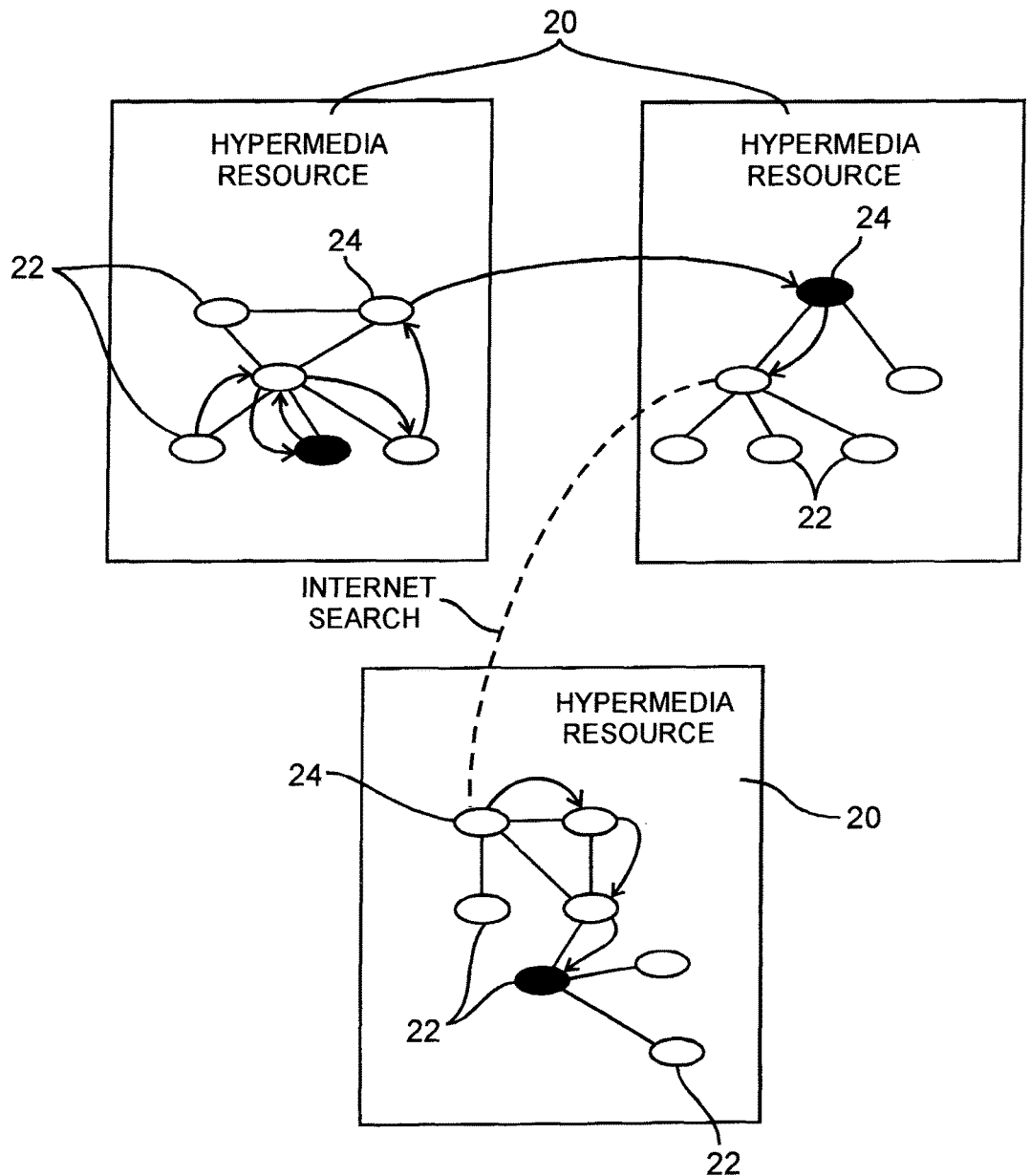
FIG. 14 diagrammatically illustrates one preferred embodiment of a method for creating a linear hypermedia resource program.
Figure 15:
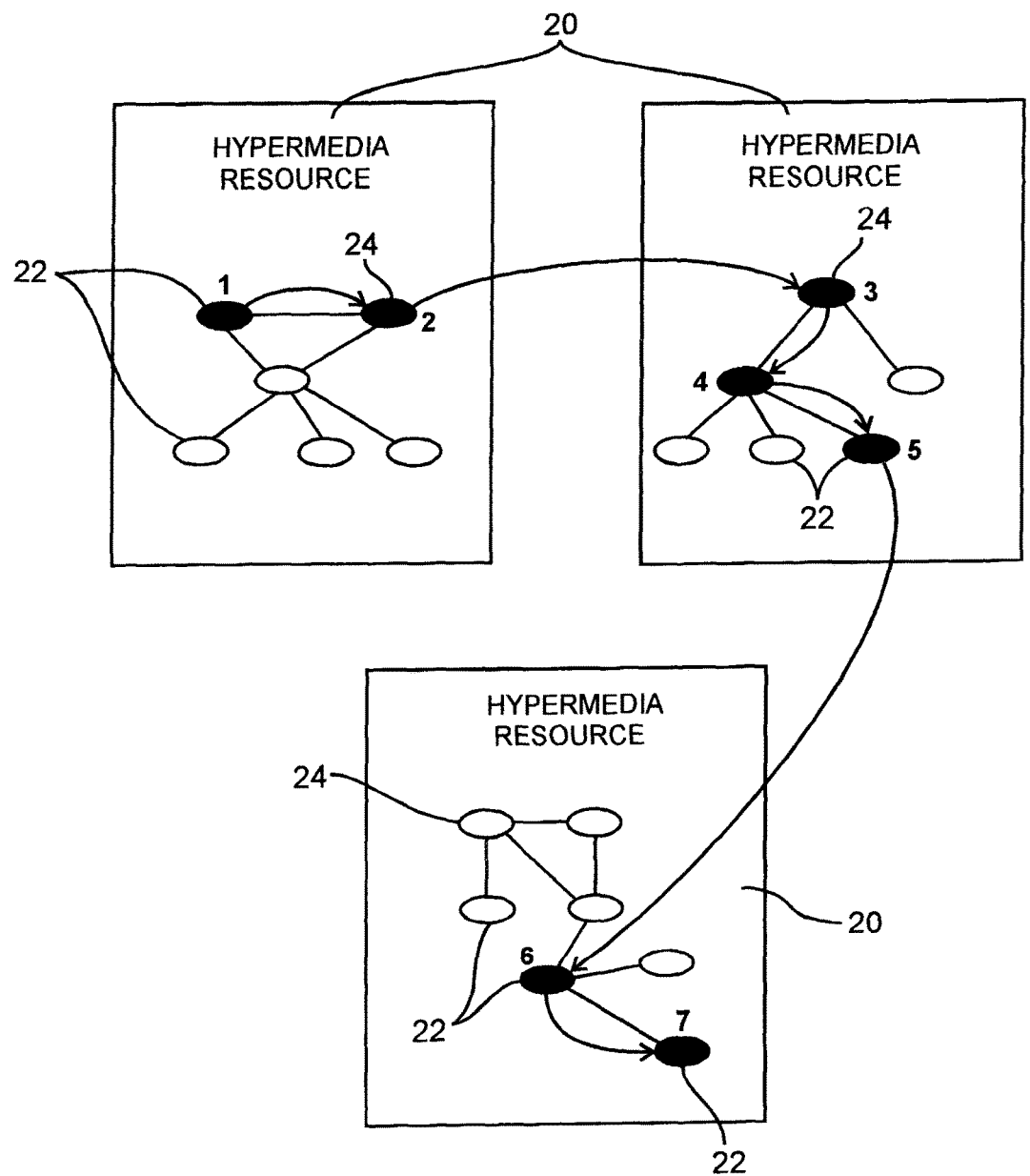
FIG. 15 illustrates an alternative embodiment for of a method for creating a linear hypermedia resource program.

FIGS. 13-15 provide a pictorial representation of a linear program, browsing a linear program, and the steps of creating a linear program. FIG. 13 best illustrates browsing the linear program depicted in FIG. 3. As indicated by link selection arrows 122, a user is allowed to browse media elements, other than the base media element stored in the linear program, in a hypermedia resource using existing Web browser type technology. Although a user may be viewing a media element other than the initial base media elements of the first type of media resource, the forward and backward selection buttons of the user interface will automatically invoke the exclusive forward or backward link 27 to transport the user to the base media element 24 of the second selected hypermedia resource or back to the base media element of the previous hypermedia resource. Assuming the common remote information node 16 received the command to move forward to the second hypermedia resource, the user again has the freedom to browse media elements starting with the base media element in the second hypermedia resource. Again, regardless of the media element presently being viewed in the second hypermedia resource, selecting the forward or back button in the user interface will only allow the user to move to the base element of the prior hypermedia resource or of any subsequent hypermedia resource in the order previously assigned in the linear hypermedia resource program.

Different versions of a method for creating a linear hypermedia resource program are pictorially illustrated in FIGS. 14 and 15. FIG. 14 illustrates the ability to select any one of a number of media elements from desired media resources and add the selected media elements to a linear hypermedia resource program. A first media element may be selected from a hypermedia resource and then a user may use a hyper link to jump to a second hypermedia resource, select a media element from the second hypermedia resource, and then the user may decide to implement a search engine to search the Web and jump to an unrelated third hypermedia resource. At the third hypermedia resource, the user can select any of the media elements to add to the linear hypermedia resource program. Alternatively, as shown in FIG. 15, the user may elect to add every media element, in the sequence encountered while browsing, to a linear hypermedia resource program.

The various methods described herein, in a preferred embodiment, are intended for operation as software programs running on a computer processor. One of ordinary skill in the art will recognize that other hardware implementations such as application specific integrated circuits, programmable logic arrays and other hardware devices can likewise be constructed to implement the methods described herein. It should also be noted that the various methods of the present invention can be implemented in software, in one of a variety of known computer languages, and stored on a tangible storage medium such as a magnetic or optical disk, read-only memory or random access memory and be produced as an article of manufacture.

As has been described above, a system and method for navigating and creating linear hypermedia resource programs are provided. The system and method provide a serial entertainment medium for internet Web users of all experience levels. A common remote information node such as a server operated by an internet service provider may generate, and store the contents of, a linear hypermedia resource program. A user can access the program through a user interface from a subscriber terminal. The program, which may consist of Web pages from one or more websites, is preferably traversed linearly with the user interface. Depending on a selected skill level, various links may be disabled to better guide a user along the predetermined linear path. The method also describes selecting media elements to include and editing their placement in the linear program. As will be recognized by those skilled in the art, the type of computers and communications devices used may be any one of a number of commonly available computers and communications devices. The communications networks for interconnecting hypermedia resources in the distributed hypermedia resource network may be internet communications networks or other types of networks.

It is intended that the foregoing detailed description be regarded as illustrative rather than limiting, and that it be understood that the following claims, including all equivalents, are intended to define the scope of the invention.

What is claimed is:

1. A method of presenting a linear program of video elements, the method comprising:
   receiving, via a server of a World Wide Web including a processor and a memory, search data indicating search criteria associated with video content;
   wherein the server of the World Wide Web responds to the search criteria by:
      selecting, via the server of the World Wide Web, a first video element;
      selecting, via the server of the World Wide Web, a second video element;
      selecting, via the server of the World Wide Web, a third video element;
      associating, via the server of the World Wide Web, the first video element, the second video element and the third video element along with other video elements in a linearly linked fashion to produce the linear program of video elements;
      transmitting, via the server of the World Wide Web, first data for display in a map area of a display screen of a client device associated with a user, the first data including a plurality of indicators, each of the plurality of indicators representing a corresponding one of the first video element, the second video element and the third video element; and
      transmitting via the server of the World Wide Web and for display on the display screen of the client device associated with the user, second data including a forward link indicator;
   receiving, via the server of the World Wide Web, third data from the client device associated with the user indicating a selection of the forward link indicator;

updating, via the server of the World Wide Web, the first data to form updated first data for display in the map area in response to selection of the forward link indicator; and receiving, via the server of the World Wide Web, fourth data from the client device associated with the user indicating a selection by the user of one of the plurality of indicators representing a selected one of, the first video element, the second video element or the third video element;

wherein the first video element, the second video element and the third video element are stored on the server of the World Wide Web and wherein the selected one of, the first video element, the second video element or the third video element is transmitted, via the server of the World Wide Web, to the client device associated with the user.

2. The method of claim 1 further comprising:
transmitting, via the server of the World Wide Web, fifth data for display on the display screen of the client device associated with the user, the fifth data including a backward link indicator that selects a previous program element of the linear program of video elements.

3. The method of claim 2 further comprising:
receiving, via the server of the World Wide Web, sixth data from the client device associated with the user indicating a selection of the backward link indicator; and
updating, via the server of the World Wide Web, the first data for display in the map area in response to selection of the backward link indicator.

4. The method of claim 1 further comprising:
determining, via the server of the World Wide Web and in response to the third data, a next program element of the linear program of video elements, based on the linear program of video elements and further based on the selected one of, the first video element, the second video element or the third video element;
transmitting, via the server of the World Wide Web, fifth data for display on the display screen of the client device associated with the user, the fifth data including the next program element of the linear program of video elements.

5. The method of claim 1 wherein the search criteria designates a file information content.

6. The method of claim 1 further comprising:
receiving, via the server of the World Wide Web, fifth data from the client device associated with the user indicating a sequential selection by the user of the forward link indicator; and
repeatedly navigating, via the server of the World Wide Web, the linear program of video elements in a forward order in response to the fifth data.

7. The method of claim 6 wherein repeatedly navigating the linear program of video elements in the forward order includes sequentially transmitting, for display on the display screen of the client device associated with the user, sixth data indicating additional ones of the linear program of video elements in the forward order.

8. The method of claim 1 further comprising:
receiving, fifth data from the client device associated with the user indicating a sequential selection by the user of a backward link indicator; and
repeatedly navigating the linear program of video elements in a backward order in response to the fifth data.

9. The method of claim 8 wherein repeatedly navigating the linear program of video elements in the backward order includes sequentially transmitting, for display on the display screen of the client device associated with the user, fifth data successive ones of the linear program of video elements in the backward order.

10. The method of claim 1 wherein the updated first data for display in the map area of the display screen of the client device associated with the user includes an updated plurality of indicators, wherein at least one of the updated plurality of indicators represents one of the other video elements.

11. A method of presenting a linear program of video elements, the method comprising:
receiving, via a server of a World Wide Web including a processor and a memory, search data indicating search criteria associated with video content;
wherein the server of the World Wide Web responds to the search criteria by:
selecting, via the server of the World Wide Web, a first video element;
selecting, via the server of the World Wide Web, a second video element;
selecting, via the server of the World Wide Web, a third video element;
associating, via the server of the World Wide Web, the first video element, the second video element and the third video element along with other video elements in a linearly linked fashion to produce the linear program of video elements;
transmitting, via the server of the World Wide Web, first data for display in a map area of a display screen of a client device associated with a user, the first data including a plurality of indicators, each of the plurality of indicators representing a corresponding one of the first video element, the second video element and the third video element; and
transmitting via the server of the World Wide Web and for display on the display screen of the client device associated with the user, second data including a forward link indicator;
receiving, via the server of the World Wide Web, third data from the client device associated with the user indicating a selection of the forward link indicator;
updating, via the server of the World Wide Web, the first data to form updated first data for display in the map area in response to selection of the forward link indicator, wherein the updated first data for display in the map area of the display screen of the client device associated with the user includes an updated plurality of indicators, wherein at least one of the updated plurality of indicators represents one of the other video elements; and
receiving, via the server of the World Wide Web, fourth data from the client device associated with the user indicating a selection by the user of one of the plurality of indicators representing a selected one of, the first video element, the second video element or the third video element;
wherein the first video element, the second video element and the third video element are stored on the server of the World Wide Web and wherein the selected one of, the first video element, the second video element or the third video element is transmitted, via the server of the World Wide Web, to the client device associated with the user.

12. The method of claim 11 further comprising:
transmitting, via the server of the World Wide Web, fifth data for display on the display screen of the client device associated with the user, the fifth data including a backward link indicator that selects a previous program element of the linear program of video elements.

13. The method of claim 12 further comprising:
receiving, via the server of the World Wide Web, sixth data from the client device associated with the user indicating a selection of the backward link indicator; and
updating, via the server of the World Wide Web, the first data for display in the map area in response to selection of the backward link indicator.

14. The method of claim 11 further comprising:
determining, via the server of the World Wide Web and in response to the third data, a next program element of the linear program of video elements, based on the linear program of video elements and further based on the selected one of, the first video element, the second video element or the third video element;
transmitting, via the server of the World Wide Web, fifth data for display on the display screen of the client device associated with the user, the fifth data including the next program element of the linear program of video elements.

15. The method of claim 11 wherein the search criteria designates a file information content.

16. The method of claim 11 further comprising:
receiving, via the server of the World Wide Web, fifth data from the client device associated with the user indicating a sequential selection by the user of the forward link indicator; and
repeatedly navigating, via the server of the World Wide Web, the linear program of video elements in a forward order in response to the fifth data.

17. The method of claim 16 wherein repeatedly navigating the linear program of video elements in the forward order includes sequentially transmitting, for display on the display screen of the client device associated with the user, sixth data indicating additional ones of the linear program of video elements in the forward order.

18. The method of claim 11 further comprising:
receiving, fifth data from the client device associated with the user indicating a sequential selection by the user of a backward link indicator; and
repeatedly navigating the linear program of video elements in a backward order in response to the fifth data.

19. The method of claim 18 wherein repeatedly navigating the linear program of video elements in the backward order includes sequentially transmitting, for display on the display screen of the client device associated with the user, fifth data successive ones of the linear program of video elements in the backward order.

20. A method of presenting a linear program of video elements, the method comprising:
receiving, via a server of a World Wide Web including a processor and a memory, search data indicating search criteria associated with video content;
wherein the server of the World Wide Web responds to the search criteria by:
selecting, via the server of the World Wide Web, a first video element;
selecting, via the server of the World Wide Web, a second video element;
selecting, via the server of the World Wide Web, a third video element;
associating, via the server of the World Wide Web, the first video element, the second video element and the third video element along with other video elements in a linearly linked fashion to produce the linear program of video elements; and
transmitting, via the server of the World Wide Web, first data for display in a map area of a display screen of a client device associated with a user, the first data including a plurality of indicators, each of the plurality of indicators representing a corresponding one of the first video element, the second video element and the third video element;
updating, via the server of the World Wide Web, the first data to form updated first data for display in the map area, wherein the updated first data for display in the map area of the display screen of the client device associated with the user includes an updated plurality of indicators, wherein at least one of the updated plurality of indicators represents one of the other video elements; and
receiving, via the server of the World Wide Web, fourth data from the client device associated with the user indicating a selection by the user of one of the plurality of indicators representing a selected one of, the first video element, the second video element or the third video element;
wherein the first video element, the second video element and the third video element are stored on the server of the World Wide Web and wherein the selected one of, the first video element, the second video element or the third video element is transmitted, via the server of the World Wide Web, to the client device associated with the user.

* * * * *